US008800007B1

(12) United States Patent  
Rajagopalan (10) Patent No.: US 8,800,007 B1  
(45) Date of Patent: Aug. 5, 2014

(54) VPN SESSION MIGRATION ACROSS CLIENTS

(75) Inventor: Chandrasekaran Rajagopalan, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 238 days.

(21) Appl. No.: 13/168,074

(22) Filed: Jun. 24, 2011

(51) Int. Cl.  
*G06F 15/16* (2006.01)  
*H04L 9/32* (2006.01)

(52) U.S. Cl.  
USPC ...... 726/5; 726/11; 726/14; 726/15; 713/150; 713/151; 713/173; 380/27; 380/44; 380/281

(58) Field of Classification Search  
CPC .................................. G06F 15/16; H04L 9/32  
See application file for complete search history.

(56) References Cited

U.S. PATENT DOCUMENTS

| | | | |
|---|---|---|---|
| 6,473,863 B1* | 10/2002 | Genty et al. ...................... | 726/3 |
| 6,675,225 B1 | 1/2004 | Genty et al. | |
| 6,751,190 B1* | 6/2004 | Swallow ...................... | 370/217 |
| 6,915,436 B1 | 7/2005 | Booth, III et al. | |
| 2003/0088698 A1 | 5/2003 | Singh et al. | |
| 2004/0225895 A1 | 11/2004 | Mukherjee et al. | |
| 2004/0268142 A1 | 12/2004 | Karjala et al. | |
| 2005/0125542 A1 | 6/2005 | Zhu | |
| 2006/0039356 A1* | 2/2006 | Rao et al. ...................... | 370/352 |
| 2006/0230446 A1 | 10/2006 | Vu | |
| 2009/0287828 A1* | 11/2009 | Wei et al. ...................... | 709/227 |
| 2011/0270751 A1* | 11/2011 | Csinger et al. ................... | 705/42 |

OTHER PUBLICATIONS http://www.cisco.com/c/en/us/solutions/collateral/enterprise/design-zone-branch-wan/guide_c07-690217.pdf "Next Generation Enterprise WAN DMVPN-to-Get VPN Migration Guide"—Cisco, Nov. 2011.*  
U.S. Appl. No. 12/967,977, by Yin Wei, filed Dec. 14, 2010.

* cited by examiner

*Primary Examiner* — Randy Scott  
(74) *Attorney, Agent, or Firm* — Shumaker & Sieffert, P.A.

(57) ABSTRACT

In general, techniques are described for seamlessly migrating a secure session established between a first computing device and a secure access appliance to a second computing device. In one example, a client computing device establishes a secure session with a secure access appliance. The client computing device receives a request via a communication channel from a second client computing device for secure session data for the first secure session usable by the second client computing device to establish a second secure session with the secure access appliance. The client computing device generates a message that includes the secure session data for the first secure session and sends the message to the second client computing device. Responsive to receiving the message, the second client computing device establishes a new secure session with the secure access appliance.

31 Claims, 5 Drawing Sheets

VPN SESSION MIGRATION ACROSS CLIENTS

TECHNICAL FIELD

The invention relates to network communication.

BACKGROUND

Use of mobile computing devices to access computer data networks has recently increased dramatically. These mobile computing devices, e.g., smartphones, tablet computers, and laptops, provide platforms for access to computer data services. The ubiquitous use of mobile computing devices and the increasing desire by users for fast, secure network access from around the world has presented many challenges for enterprises. Enabling even basic connectivity across all desired mobile computing device platforms can be a huge challenge. Enabling secure connectivity with an easy end-user experience can be even more challenging. As numerous different endpoint security and connectivity software applications are added to each end user mobile device, the potential for problems and network conflicts increases. It is currently very difficult for information technology (IT) staff to enable network connectivity for users from any device, at any time, from virtually anywhere, without requiring significant end-user interaction with complex technologies.

Secure access appliances may provide secure access to resources including network storage or other network services. A user may use secure access client software executing on a computing device to securely connect to a secure access appliance. For example, the user may initially authenticate with the secure access appliance using the secure access client software to create a secure session. The secure session may, e.g., create and/or connect to a Virtual Private Network (VPN).

SUMMARY

In general, techniques are described to enable a user to seamlessly migrate a secure session from one computing device to another with minimal or no user intervention. The secure session may include state information generated when the secure access client software accesses services provided via the secure access appliance.

The techniques may be useful in environments where a user alternately employs multiple computing devices, e.g., a smartphone, laptop, and desktop personal computer that each executes secure access client software. In one example implementation, the user may initiate a secure session on a first computing device, e.g., a desktop personal computer, but may later wish to continue the secure session on a second computing device, e.g., a smartphone. In some aspects of the present disclosure, the second device may request and receive secure session data from the first device that enables the second device to automatically authenticate to the secure access appliance and reestablish the secure session for the user with the second device without user intervention. In this way, techniques of the present disclosure eliminate the need for a user to manually re-authenticate to a secure access appliance when connecting to an existing secure session from a different computing device. Such techniques also decouple a particular secure session from a particular computing device.

Thus, aspects of the present disclosure may enable seamless migration of a secure session from one computing device to another to allow a user to transition to another computing device without having to manually re-authenticate the computing device to a secure access appliance. Such techniques may remove the burden on the user to re-enter user authentication credentials, for example, in order to re-authenticate and/or reestablish a secure session. Aspects of the present disclosure may therefore simplify a user's experience by enabling the user to continue using a secure session regardless of the computing device currently employed by the user.

In one example, a method comprises establishing, by a first client computing device, a first secure session with a secure access appliance. The method also comprises receiving, by the first client computing device via a communication channel, a request from a second client computing device for secure session data for the first secure session usable by the second client computing device to establish a second secure session with the secure access appliance. The method also includes generating, by the first client computing device, a message including the secure session data for the first secure session. The method also includes sending, by the first client computing device, the message to the second client computing device.

In one example, a client computing device comprises a session migration module that establishes a first secure session with the secure access appliance. The client computing device also comprises one or more network interfaces that receive, via a communication channel, a request from a second client computing device for secure session data for the first secure session usable by the second client computing device to establish a second secure session with the secure access appliance. The session migration module further generates a message including the secure session data for the first secure session and the one or more network interfaces send the message to the second client computing device.

In another example, a secure access appliance comprises one or more network interfaces to receive, from a first client computing device, a message that identifies a second client computing device. The secure access appliance also comprises a session management module to generate secure session data usable by the second client computing device to establish a secure session with the secure access appliance. The one or more network interfaces receive, from the second client computing device, a request to establish the secure session with the secure access appliance; and the session management module establishes the secure session with the second client computing device.

In another example, a system comprises a first client computing device; a second client computing device; a communication channel between the first client computing device and the second client computing device; and a secure access appliance. The first client computing device comprises a control unit comprising a session migration module configured to establish a secure session with the secure access appliance. The first client computing device also comprises one or more network interfaces configured to receive a request, via the communication channel, from the second client computing device for secure session data usable by the second client computing device to establish the secure session with the secure access appliance. The session migration module is further configured to generate a message that includes the secure session data. The one or more network interfaces are also configured to send the secure session data to the second client computing device. In the example, the second client computing device, responsive to receiving the message, establishes the secure session with the secure access appliance.

The details of one or more embodiments of the invention are set forth in the accompanying drawings and the descrip-

DETAILED DESCRIPTION

Figure 1:
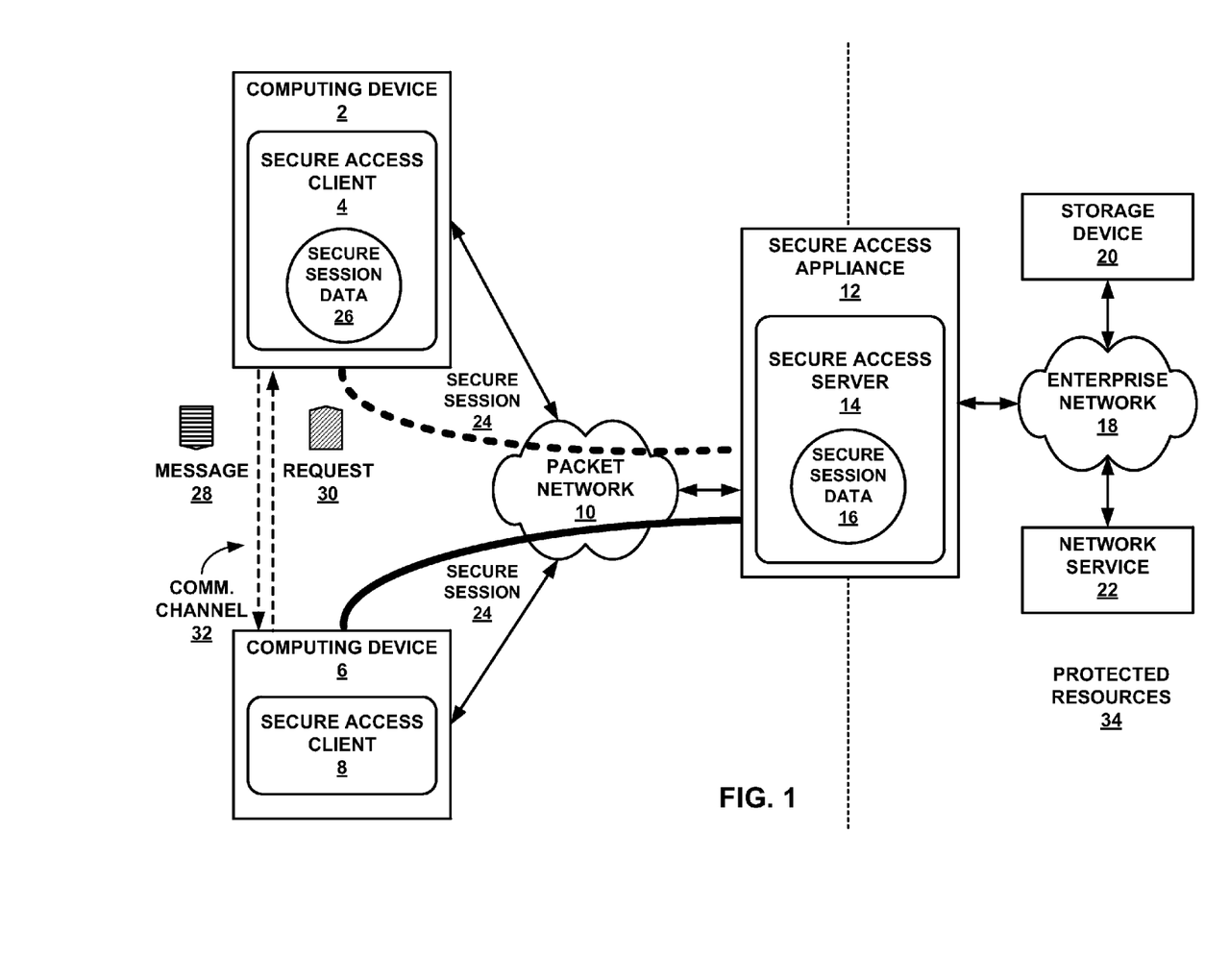
FIG. 1 is a block diagram illustrating a first computing device migrating a secure session with a secure access appliance to a second computing device, in accordance with one or more aspects of the present disclosure.

FIG. 1 is a block diagram illustrating an example of a secure access appliance 12 that provides access to protected resources of enterprise network 18 such as storage device 20 and network service 22. That is, secure access appliance 12 enables secure and controlled access to protected resources 34 provided by enterprise network 18. For example, computing devices 2 and 6 remotely access enterprise network 18 via secure access appliance 12 and packet network 10, which may represent the Internet or other packet-based network.

In one example, secure access appliance 12 is a secure sockets layer VPN (SSL VPN) device that provides VPN services to secure access clients 4, 8 executing on respective computing devices 2, 6. Secure access appliance 12 may be a standalone appliance or may be hosted on one or more other devices, such as an intrusion detection and prevention (IDP) system, a firewall, a unified threat management (UTM) device, a router, or other secure access appliance. Secure access server 14, executing on secure access appliance 12, may include one or more modules that manage secure sessions between secure access appliance 12 and computing devices 2 and 6. In some examples, secure access server 14 facilitates the migration and/or sharing of a secure session from one computing device 2 to computing device 6. Further details of secure session migration and sharing are described herein.

Secure access appliance 12 intermediates access of computing devices 2, 6 to protected resources. In one example, secure access appliance 12 terminates incoming access requests and connections at the application layer of the Open System Interconnection (OSI) reference model or of the TCP/IP model. In this example, secure access appliance 12 operates as an application-layer proxy to protect resources 34 such as storage device 20 and network service 22 from direct exposure to packet network 10. Secure access appliance 12 receives incoming access requests encapsulated in a packet, decapsulates the access requests to reach the underlying application data, and sends the application data comprising the access requests to requested protected resources.

In another example, secure access appliance 12 allows direct connections between layers of the OSI reference model or of the TCP/IP model. In this example, secure access appliance 12 exchanges data using a secure channel negotiated with the requesting one of computing devices 2, 6. Secure access appliance 12 receives a secure request via the secure channel and makes requests to, e.g., storage device 20 on behalf of the requesting computing device to establish a data connection between the requesting computing device and storage device 20.

Enterprise network 18 provides access to sensitive data and services that are accessible only to certain authorized users of the enterprise. The users access enterprise network 18 by creating a secure session with secure access appliance 12 through packet network 10. In this way, enterprise administrators use secure access appliance 12 to discriminate access to enterprise network 18 by, e.g., individual employees based on employee authorization or other credentials. In this way, users remotely access protected resources 34 such as storage device 20 and network service 22 of enterprise network 18. Although shown as storage device 20 and network service 22, protected resources 34 include any of a web server, an application server, a database server, a file server, an application, an employee workstation, a native messaging or email client, or other electronic resource.

As shown in FIG. 1, computing devices 2, 6 may be client computing devices for use by an end-user. That is, computing devices 2, 6 are end-user devices that make use of services provided by enterprise network 18, including data services provided by protected resources 34 and security services offered by secure access appliance 12. Client computing devices in some examples may comprise endpoint devices that initiate and terminate data transfers. Client computing devices include personal computers, laptop computers or other types of computing devices associated with individual employees or other authorized users. Client computing devices, in some examples make cellular phone calls and access cellular-based computer data services. That is, client computing devices may be wireless communication devices capable of cellular communications. Client computing devices may include, for example, a mobile telephone, a laptop or desktop computer having, e.g., a 3G wireless card, a wireless-capable netbook, a video game device, a pager, a smart phone, or a personal data assistant (PDA). Each of computing devices 2 and 6 may run one or more applications, such as secure access clients 4, 8, video games, videoconferencing applications, and email applications, among others.

Computing devices 2 and 6, in some examples, include secure access clients 4, 8. Using a secure access client, a user supplies their credentials, e.g., username and password, and the secure access client interacts with secure access appliance 12 to handle all provisioning and deployment of secure network communication. As such, secure access clients 4, 8 enable fast, easy, secure access to corporate networked and cloud-based data and applications from mobile devices and smart phones. Enterprises and service providers can deploy granular role and device-based security policies when provisioning mobile handset access. In one example, a secure access client provides a single, unified client for VPN remote access, WAN acceleration, and endpoint compliance. As such, secure access client may eliminate the expense and administrative burden of deploying, configuring, and maintaining separate clients. In some examples, secure access clients 4, 8 act as VPN Control Application 80 as described in U.S. patent application Ser. No. 12/967,977, incorporated herein by reference. In some examples, secure access server 14 acts as VPN gateway 12 as described in U.S. patent application Ser. No. 12/967,977.

Secure access appliance 12 enables a computing device to connect to secure access appliance 12 using a VPN service. For example, secure access appliance 12 may require user credentials to establish authentication and authorization. Credentials include, for example, a username-password pair, a biometric identifier, a data stored on a smart card, a one-time password token or a digital certificate. Secure access client 4, for example, provides such credentials to secure access server 14 when secure access client 4 attempts to access protected resources such as storage device 20 and/or network service 22. Based on the credentials provided by secure access client 4, secure access appliance 12 authorizes or denies secure access client 4 access to enterprise network 18. Secure access client 4 and secure access server 14 may also negotiate other aspects of a network connection that ensure security, including the type/version of an encryption algorithm, and symmetric keys for encrypting/decryption data.

As shown in FIG. 1, computing devices 2, 6 each, respectively, include secure access clients 4, 8. A single user may alternately or concurrently employ both computing devices 2, 6 to access to information provided by protected resources such as storage device 20 and network service 22. For example, the user may own a smartphone and tablet personal computer in the form of respective computing devices 2, 6. In addition, the user may be an employee of an organization that provides the user with a desktop personal computer and laptop computer in the form of respective computing devices 2, 6. To access protected resources 34, the user provides credentials to authenticate the client device to the secure access appliance, e.g., secure access client 4 executing on computing device 2 authenticate to secure access server 14.

In accordance with aspects of the present disclosure, techniques are provided to enable an authenticated computing device to migrate or share a secure session with a second computing device such that the second computing device may automatically establish a secure session with a secure access appliance. A secure session is a collection of session data, such as encryption keys, tokens, session state, user identifiers and credentials, protocol identifiers, and/or protocol state, that defines a secure association between two computing devices and enables the two computing devices to securely communicate over an insecure transport medium to provide secure access to protected resources. For example, as shown in FIG. 1, secure access server 14 and computing devices 2 establish respective secure sessions that assure the secure access server that computing devices 2 are authentic and should be allowed to access storage device 20 and network service 22. A secure session may include a network tunnel such as a Secure Socket Layer (SSL) tunnel to provide a VPN secure session. A secure session may also include an Internet Protocol Security (IPsec) session that provides a VPN secure session. Secure access server 14 may use asymmetric encryption such as public key cryptography to exchange a symmetric key and/or other secure session data with secure access client 4 that secure access client 4 and secure access server 14 then use to encrypt and decrypt transmissions of the secure session. In this way, once computing device 2 has established a secure session with secure access server 14, computing device 2 may securely communicate information with secure access server 14.

To access protected resources, a user authenticates secure access client 4 with secure access server 14. In some examples, secure access server 14 requires authentication credentials such as a username and password from secure access client 4. In such examples, a user provides a username and password as user input to secure access client 4. Secure access client 4 in turn sends the credentials to secure access server 14. Secure access server 14 authenticates the user by verifying the username and password combination. Secure access server 14 may in some examples access an authentication, authorization and accounting (AAA) server to authenticate the credentials provided by secure access client 4. The AAA server may execute on secure access appliance 12 or on a separate secure access appliance and may be, for example, a Remote Authentication Dial-In User Service (RADIUS) server. Secure access server 14 may further generate an authentication token that identifies the identity and/or authenticity of the user. In some examples, secure access servicer 14 may send the authentication token as a cookie to secure access client 4. In subsequent communications with secure access server 14, secure access client 4 attaches the authentication token to subsequent data communications sent to secure access server 14. Secure access server 14 determines a data communication is received from an authenticated secure access client by inspecting the authentication token included in the data communication.

In some examples, secure access client 4 and secure access server 14 generate secure session data 26, 16, respectively, when establishing secure session 24. Examples of secure session data include a public key, private key, symmetric or shared key, username and password credentials, Uniform Resource Locator (URL) or Internet Protocol (IP) address that identifies the secure access appliance, session identifier, session timeout value, and/or an identifier of the encryption algorithm used to establish the secure session. More generally, secure session data may include any data to facilitate communication between two networked computing devices.

In the current example, a user may wish to migrate secure session 24 from computing device 2 to computing device 6. For example, a user may be presently working on computing device 2, e.g., a desktop computer, but may wish to continue using secure session 24 on computing device 6, e.g., a smartphone. To migrate the secure session, the user initially provides a user input that causes secure access client 8 to generate a communication channel 32 with secure access client 4. In other examples, security access client 8 may automatically determine secure access client 4 is in physical proximity and generate communication channel 32 with secure access client 4. In any case, computing devices 2, 6 include communication hardware usable by secure access clients 4, 8 to communicate information using various communication protocols. Examples of such protocols include Bluetooth, Near-Field Communication (NFC), and WiFi. In some examples, a communication channel comprises a connection enabling communication between the first client computing device and the second client computing device in which secure access appliance 12 does not participate to receive, send, route, forward, switch, or authenticate messages exchanged in the communication channel. In other words, such a connection is not mediated by secure access appliance 12. For example, the first client computing device may transfer the secure session to the second client computing device independently of the secure access appliance. Examples of a communication channel may be a Bluetooth connection, NFC connection, WiFi connection, USB connection, or IEEE 1394 connection between the first client computing device and the second client computing device.

Once communication channel 32 is established, secure access client 8 generates a request 30 that includes instructions and/or data requesting secure session data 26. Secure session data 26 may be usable by the secure access client 8 to seamlessly and automatically establish secure session 24 with secure access server 14. Secure access client 8 may send request 30 to secure access client 4 for processing.

Secure access client 4 receives request 30 from computing device 2 using communication channel 32. In some examples, secure access client 4 initially inspects request 30 to determine that request 30 has been generated by a compatible secure access client. Secure access client 4 then selects secure session data 26 usable by secure access client 8 to establish secure session 24 with secure access server 14. In some examples, secure session data 26 may include public and private keys used by secure access client 4 to establish a secure session with secure access appliance 12. Secure session data 26 may also include a session identifier, session timeout value, and type/version of an encryption algorithm used by secure access client 4 and secure access server 14. Secure session data 26 may include a username and password combination or cookie that includes an authentication token usable by secure access client 8 to authenticate with secure access server 14. Secure session data 26 may additionally include a URL and/or network address that identifies secure access server 12.

Once secure access client 4 has selected secure session data 26, secure access client 4 generates a message 28 that includes secure session data 26. Message 28 may be structured in a format interpretable by secure access client 8. Secure access client 4 the sends message 28 to secure access client 8 using communication channel 32.

Upon receiving message 28, session access client 8 establishes a secure session with secure access server 14 using the secure session data included in message 28. Because message 28 includes all secure session data necessary to authenticate, securely transfer data, and identify secure session 24, secure access client 8 may automatically establish secure session 24 with secure access server 14 without user intervention. For instance, secure access client 8 may select the URL that identifies secure access server 12 from message 28 to initiate a secure session with secure access server 14. A cookie including an authentication token in message 28 may further be used by secure access client 8 to authenticate with secure access server 14. Secure access client 8 may also select the public and private keys included in message 28 to generate a secure session between secure access client 8 and secure access server 14. Using the session identifier, secure access client 8 and secure access server 14 may establish secure session 24 between computing device 2 and secure access appliance 12. For example, secure access client 8 includes the session identifier in data communications with secure access server 14 to indicate the data communications are associated with secure session 24. In this way, secure session 24 may be migrated from secure access client 4 to secure access client 8.

In some examples, secure access server 14 may enforce one or more security policies that limit migration of a secure session from one computing device to another. For instance, secure server 14 may store one or more user agent strings that identify one or more computing devices. A user agent string may be a unique identifier that identifies a computing device, such as a MAC address or user-supplied string. An administrator may determine that only computing devices configured according to defined security standards receive secure session data to migrate a secure session. In one example, a policy stored on secure access server 14 may store one or more associations between user agent strings and an authentication credential, e.g., a username. The policy may specify that a first computing device is or is not allowed to migrate a secure session and/or secure session data to a second computing device identified by a user agent string included in the policy. In this way, secure session migration may be restricted by policies defined by secure access server 14.

In one example use case, a user may wish to migrate secure session 24 from secure access client 4 to secure access client 8. Using secure access client 8, the user may initially generate a request for secure session data from secure access client 4. For instance, secure access client 8 may include a user agent string in request 30 that identifies computing device 6. Upon receiving request 30, secure access client 4 may send the user agent string to secure access server 14. Secure access client 4 may further send an authentication credential such as a username to secure access server 14 identifying the user that initiated secure session 24 to secure access server 14. Secure access server 14 may apply a security policy that includes associations between the authentication credential and one or more user agent strings to compare the user agent string and authentication credential. If the security policy includes an association between the authentication credential and the user agent string that identifies computing device 6, secure access server 14 may send a message to secure access client 4 that indicates the secure session may be migrated. Secure access server 14 may further update secure session data 16 with the user agent string of computing device 6 to indicate that secure session 24 will subsequently exist between computing device 6 and secure access appliance 12 after the migration. If the user agent string is not associated with the authentication credential in the security policy, secure access server 14 may generate a message that indicates secure access client 4 may not send secure session data to secure access client 8 or may otherwise restrict access to storage device 20 and network service 22 by computing device 6. In this way, secure session migration from secure access client 4 to secure access client 8 may be restricted by security policies stored on secure access appliance 12.

Various aspects of the disclosure may provide, in certain instances, one or more benefits and advantages. For example, when a user frequently uses multiple computing devices to access protected resources, aspects of the present disclosure may reduce the need of a user to re-authenticate with a secure access appliance each time the user switches devices. For instance, following a user's initial request to migrate a secure session, a computing device may receive secure session migration data and establish a secure session with a secure access appliance without user intervention. In this way, secure access clients may facilitate the seamless migration of secure session data from one computing device to another. Migration of secure session data may also improve user productivity by reducing the amount of time required to re-authenticate with a secure access appliance. Moreover, resource use on secure access server 14 may be reduced in some examples because creation of a new secure session for each computing device may not be required when a secure session is migrated from one computing device to another.

The aforementioned benefits and advantages are exemplary and other such benefits and advantages may be apparent in the previously-described non-limiting examples. While some aspects of the present disclosure may provide all of the aforementioned exemplary benefits and advantages, no aspect of the present disclosure should be construed to necessarily require any or all of the aforementioned exemplary benefits and advantages.

Figure 2:
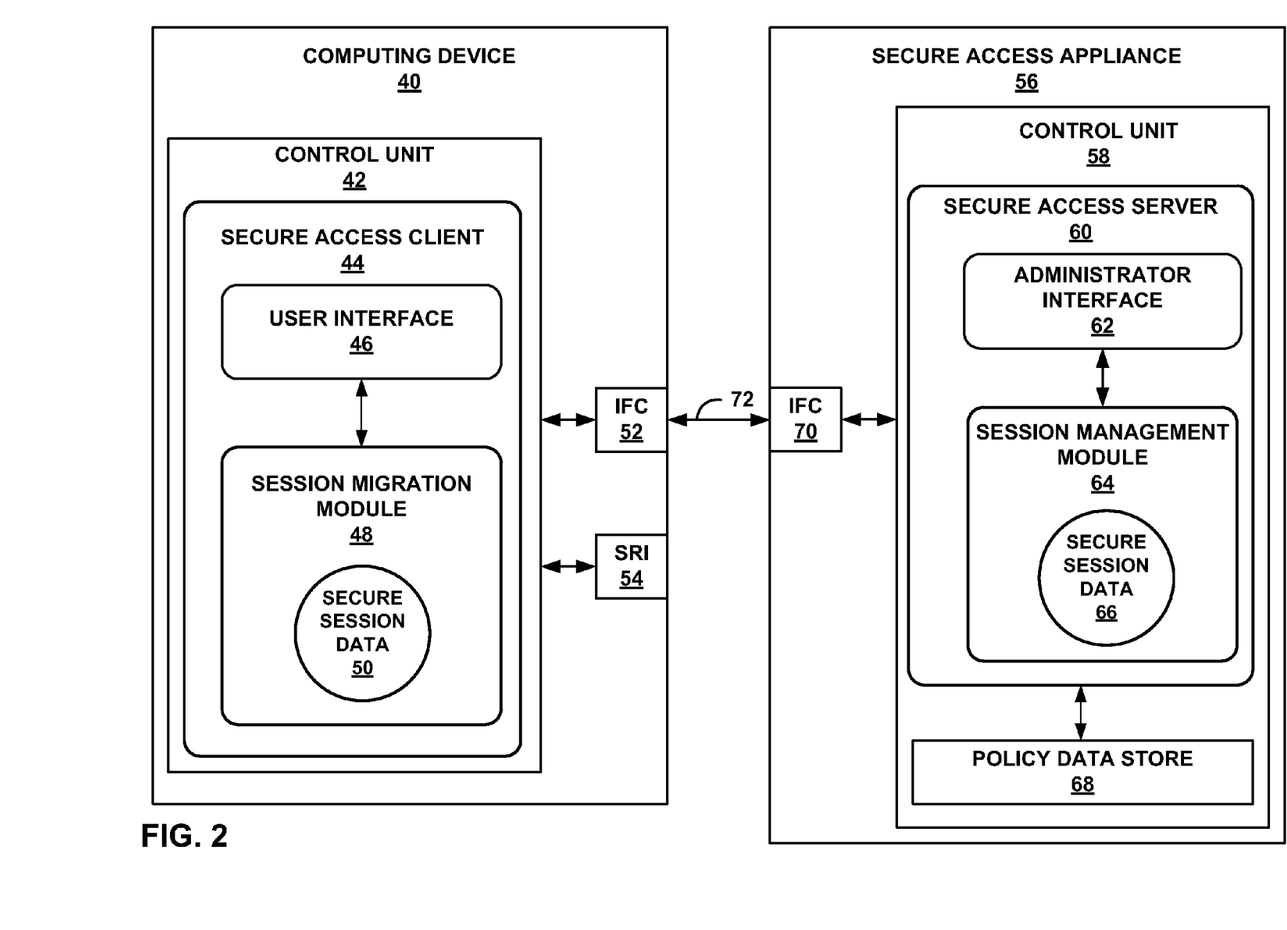
FIG. 2 is a block diagram illustrating further illustrating an example of a computing device and secure access appliance that may implement techniques described in accordance with one or more aspects of the present disclosure.

FIG. 2 is a block diagram illustrating an example of a computing device 40 and secure access appliance 56 that implement techniques described in this disclosure. Computing device 40 and secure access appliance 56 are connected via network interfaces 52 and 70 using network elements 72. Network elements 72 generally represent any communication devices and elements (e.g., switches, routers, links) of a larger network that may comprise any type of network capable of transmitting data, such as a layer three (L3) packet-switched network (e.g., the Internet) operating over one or more layer two (L2) networks (e.g., an Ethernet or multi-packet label switching (MPLS) network) that may be used to connect different secure access appliances.

As shown in FIG. 2, secure access appliance 56 includes control unit 58, secure access server 60, administrator interface 62, session management module (SMM) 48, secure session data 66, a network interface card (IFC) 70, and policy data store 68. Control unit 58 of secure access appliance 58 provides an operating environment for secure access server 60.

Secure access server 60 represents an exemplary instance of an application that may provide access to protected resources via a secure session. For example, secure access server 60 may provide a SSL VPN service to enable computing device 40 to securely connect to secure access appliance 56 and access protected resources. Although FIG. 2 describes secure access client 44 as connecting to secure access server 60 using a SSL VPN service, any other communication protocols or network services may be used for network communication.

Secure access server 60 includes an administrator interface 62. An administrator may use an administrator interface 62 to select various functions provided by session management module 64. Functions provided by session management module 64 may include but are not limited to managing secure sessions and security policies. Managing secure sessions may include specifying parameters that define session timeout values or a quantity of simultaneous secure sessions allowed per user. Managing security policies may include specifying parameters that define accessibility of protected resources based on authentication credentials or that define whether a secure session may be migrated or shared based on a user agent string and authentication credential. Administrator interface 62 may include a graphical user interface (GUI) and various selectable graphical components such as input fields, control buttons, scrollbars, text, and other graphical content associated with various functions. In this way, an administrator may use administrator interface 62 to execute various functions of secure access server 60.

SSM 64 of secure access server 60 receives incoming requests from computing device 40 via IFC 70 to generate a session with computing device 40. For instance, computing device 40 may send a request to secure access server 60 for a secure session using public key cryptography. In such examples, session management module 64 may facilitate the verification and signing of communication data using private and public keys to establish the secure session with computing device 40. In addition, SMM 64 may receive a username and password combination from computing device 4 when a user wishes to authenticate with secure access appliance 56. In such examples, SMM 64 may compare the username/password combination with one or more valid username/password combinations stored in an authentication server (not shown) that is included in or connected to secure access appliance 56. An authentication server, generally, may include one or more valid username/password combinations and may be used to authenticate a user based on the username/password or other credential provided by the user. If the SMM 64 determines the combination is valid, SMM 64 may generate an authentication token which may be included in a cookie. SMM 64 may send the authentication token to computing device 40 to use for future communications with SSM 64. If the SSM 64 determines the combination is not valid, SSM 64 may generate a message indicating an invalid combination, which is sent to computing device 40.

Policy datastore 68 of secure access appliance 56 includes one or more policies that determine operations of secure access server 60. The one or more policies may be used to enforce security requirements for migration and sharing of secure sessions between various computing devices. For example, as described in FIG. 1, a policy may specify a username or other authentication credential associated with one or more user agent strings. The policy may further specify one or more rules, e.g., that a secure session associated with a username may only be migrated to a computing device identified by a user agent string included in the policy. A rule may specify one or more constraints on actions that a computing device may take. In some examples, when a user wishes to migrate a secure session from computing device 40 to another computing device, computing device 40 may send a request including a user agent string and authentication credential to secure access server 60. SMM 64 may query the policies stored in policy data store 68 to determine if a migration is allowed based on the authentication credential and user agent string. SMM may generate and send a corresponding message to secure access client 44 that indicates whether the secure session may be migrated to another computing device.

In some examples, policy datastore 68 may include Relational Database Management System (RDBMS) software. In one example, policy datastore 68 may be a relational database and accessed using a Structured Query Language (SQL) interface. Policy datastore 68 may in some examples be stored on a separate networked computing device and accessed by secure access appliance 56 through IFC 70. In some examples, policy datastore 68 may be a map, hashtable, linked list, array, or any suitable data structure for storing data.

Secure access appliance 56 communicates with computing device 40 in accordance with aspects of the present disclosure. As shown in FIG. 2, computing device 40 includes control unit 42, secure access client 44, user interface 46, session migration module (SMM) 48, secure session data 50, network interface card (IFC) 52, and short-range communication interface 54. Control unit 42 of computing device 40 provides an operating environment for secure access client 44.

Secure access client 44 represents an exemplary instance of an application that may enable computing device 40 to access protected resources via a secure session with secure access appliance 56. For example, secure access client 44 may enable computing device 40 to connect to secure access appliance 56 using a SSL VPN service provided by secure access appliance 56. As described herein, secure access client 44 also provides functionality for migration and sharing of secure sessions with other computing devices.

To establish a secure session with secure access appliance 56 or migrate a secure session another computing device, a user may use a user interface 46 to select various functions of secure access client 44. Functions of user interface 46 may include but are not limited to establishing a secure session with secure access appliance 56 and migrating or sharing secure session data with a second computing device (not shown). User interface 46 may include a graphical user interface (GUI) and various graphical components such as input fields, control buttons, scrollbars, text, and other selectable and/or graphical content. In one example, a user may wish to connect to secure access appliance 56 using a SSL VPN service. The user may select a graphical component of user interface 46 such as a control button that causes session migration module 48 to securely connect to secure access appliance 56. In this way, the user may cause secure access client 44 to execute various functions using user interface 46.

Secure access client 44 also includes session migration module (SMM) 48. SMM 48 includes functionality that enables secure access client 44 to establish a secure session with secure access server 60 and subsequently migrate or share the secure session with another computing device. For instance, a user initially provides a user input via user interface 46 to generate a secure session with secure access server 60. The user input specifies secure access appliance 56, a username, a password, and an instruction to connect to secure access appliance 56. Responsive to receiving the instruction, session migration module 48 uses the selection of secure access appliance 56 to initiate a network connection with secure access appliance 56 using public key cryptography. For instance, session migration module 48 may perform verification and encryption of data using public and private keys. Session migration module 48 may use IFC 52 to connect to IFC 70 of secure access appliance 56 via network elements 72.

In order to establish a secure session with secure access appliance 56, SMM 48 may send the username and password to secure access server 60 for authentication. If secure access server 60 determines the username and password combination is valid, e.g., by comparing the combination to combinations in policy datastore 68, session migration module 48 may receive an authentication token included in a cookie, generated by secure access server 60. Session migration module 48 may use the authentication token to authenticate further communications with secure access server 60. The authentication token may be stored as secure session data 50 by secure access client 44.

When secure access client 44 establishes a secure session with secure access server 60, secure access server 60 may generate secure session data 66 that describes the secure session. Secure session data 66 as described in FIG. 1 may include, among other things, a session identifier and session timeout value. Secure session data 66 may also be sent by SMM 64 to SMM 48. SMM 48 may store this secure session data as secure session data 50, in addition to authentication tokens and public/private keys. At this point, computing device 40 has established a secure session with secure access appliance 56, which may be used to access protected resources and securely communicate information with secure access appliance 56.

At a later point in time, a user may wish to migrate a secure session that exists between computing device 40 and secure access appliance 56 to a second computing device (not shown). The second computing device may also execute a secure access client similar to secure access client 44 and may further include components similar to those of computing device 40.

Initially, a user may provide a user input via user interface 46 to detect a proximate second computing device. For example, responsive to receiving the user input, SSM 48 may cause short-range communication interface (SRI) 54 to detect an identifier or device name of the second computing device. In some examples SRI 54 may be a Universal Serial Bus, IEEE 1394 Firewire, or other wired connection interface. In such examples, computing device 40 and the second computing device may be connected by a cable for communication between the two devices. In other examples SRI 54 may be a Bluetooth, Near Field Communication or other short-range communication radio. In such examples, SRI 54 may generate and receive radio waves to detect the second computing device. When the second computing device receives the radio waves using a similar SRI, the second computing device sends in return an identifier, e.g., a device name, to computing device 40 that identifies the second computing device. Each detected computing device may be uniquely identified by a device name or MAC address, for example. A user may then select the second computing device via user interface 46 based on the identifier.

After the user has selected the second computing device via user interface 46, SMM 48 may listen for a request from the second computing device. The request from the second computing device may be a request for secure session data usable by the second computing device to establish a secure session with secure access server 60. In one example, the user may provide a user input at the second computing device to generate the request for secure session data. For example, a user interface of the secure access client executing on the second computing device may include a control button that generates the request.

SSM 48 may receive the request from the second computing device. SSM 48 may generate a message that includes secure session data 50. For example, the message may include public and/or private keys used by computing device 40 to establish a secure session with secure access appliance 56. SSM 48 may further include an authentication token to authenticate data communicated from computing device 40 to secure access appliance 56. SSM 48 may further include a session identifier of the current secure session existing between computing device 40 and secure access appliance 56. SSM 48 may further include in the message a URL or IP address of secure access appliance 56. Computing device 40, upon generating the message, may send the message to the second computing device.

Upon receiving the message, the second computing device automatically establish a secure session with secure access server 60 without user intervention. For instance, the second computing device, upon receiving the message from computing device 40 identify secure access appliance 56 using the URL or IP address included in the message. Using the public and/or private keys, the second computing device may securely connect to secure access server 60. Using the authentication token, the second computing device communicates data to secure access appliance 56, which may in turn verify the authenticity of the data using the authentication token. The second computing device may further include the session identifier with data it sends to secure access appliance 56. In this way, a secure session may be migrated from computing device 40 to the second computing device using secure session data received from computing device 40.

Control units 42 and 58 of computing devices 40, 56, respectively, may each include one or more processors (not shown) that execute software instructions, such as those used to define a software or computer program, stored to a computer-readable storage medium (not shown). Examples of computer-readable storage media include a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control units 42 and 58 may each comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Figure 3:
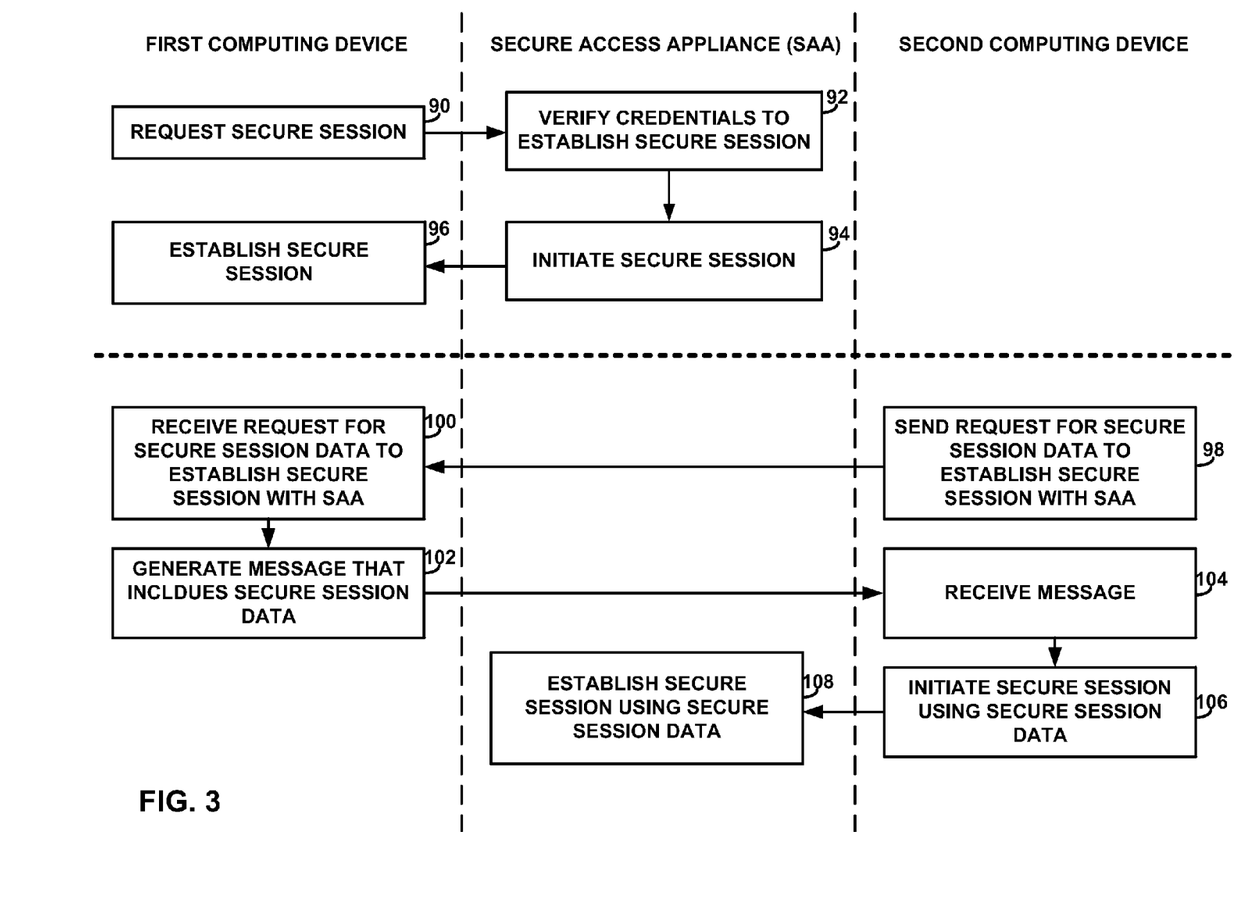
FIG. 3 is a flow chart illustrating a group of example operations to migrate a secure session that exists between a first computing device and a secure access appliance to a second computing device, in accordance with one or more aspects of the present disclosure.

FIG. 3 is a flow chart illustrating a group of example operations to migrate a secure session that exists between computing device 2 and secure access appliance 12 to computing device 6 as shown in FIG. 1. Initially, computing device 2 requests a secure session with secure access appliance 12 (90). For example, computing device 2 and secure access appliance 12 perform a SSL handshake. Computing device 2 also sends a username and password combination that secure access appliance 12 uses to authenticate the first computing device. Secure access appliance 12 verifies authentication credentials sent by computing device 2 to establish a secure session. Secure access appliance 12 may generate a cookie that includes a security token, which computing device 2 uses to authenticate further data communications. Secure access appliance 12 subsequently initiates a secure session, e.g., a SSL VPN session (94). In some examples, secure access appliance 12 may generate secure session data such as a session identifier and session timeout value. Secure access appliance 12 sends the secure session data including the cookie, session identifier, and session timeout value to computing device 2. Computing device 2 uses the secure session data to establish a secure session using secure session data (96).

At a later point in time, a user may wish to migrate the secure session from computing device 2 to computing device 6. Computing device 6 sends a request to computing device 2 for secure session data usable by computing device 6 to establish a second secure session with secure access appliance 12 (98). Computing device 2 receives the request for the secure session to establish a secure session with secure access appliance 12 (100). Computing device 2 also generates a message that includes the secure session data, which is sent to computing device 6 (102). Computing device 6 receives the message (104). Upon receiving the message, computing device 6 initiates a secure session with secure access appliance 12 using the secure session data included in the message (106). For example, computing device 6 uses public and private keys received from computing device 2 to generate a secure session with secure access appliance 12. In addition, computing device 6 uses the cookie and session identifier to initiate the secure session with secure access appliance 12. Secure access appliance 12 subsequently establishes a SSL VPN session with computing device 6 using the authentication token and session identifier included in the message received from computing device 2.

Figure 4:
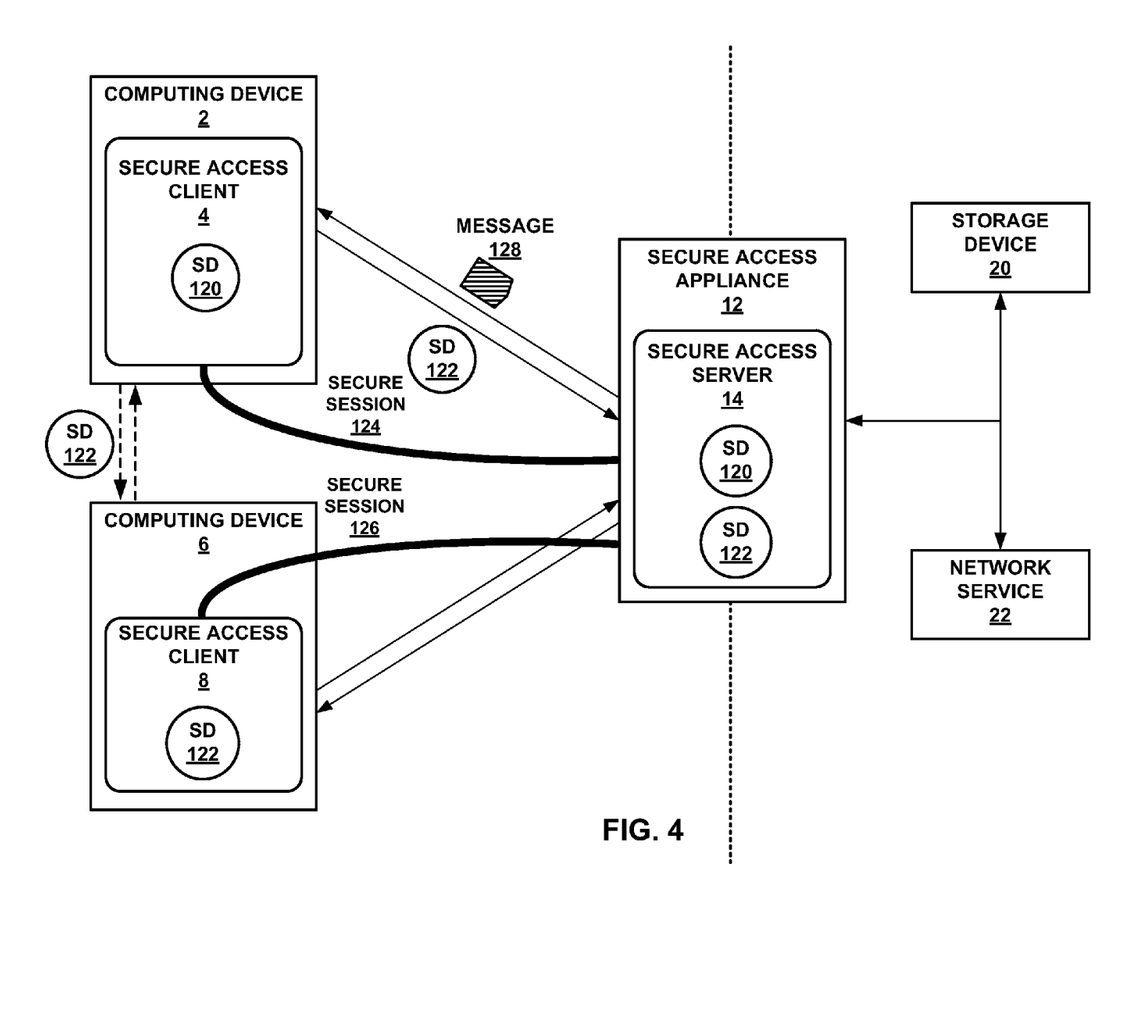
FIG. 4 is a block diagram illustrating an example of a first computing device that provides secure session data to a second computing device, in accordance with aspects of the present disclosure.

FIG. 4 is a block diagram illustrating an example of a first computing device that provides secure session data to a second computing device, in accordance with aspects of the present disclosure. The various components included in FIG. 4 may include similar properties and characteristics as described in FIGS. 1 and 2 unless otherwise described hereinafter. FIG. 4 includes computing device 2, computing device 6, secure access appliance 12, storage device 20, and network service 22. Each of the various components is connected by one or more network connections as described in FIG. 1. Computing device 2 further includes secure access client 4 and secure session data 120 (illustrated as "SD 120"). Computing device 6 further includes secure access client 8 and secure session data 122 (illustrated as "SD 122"). Secure access appliance 12 further includes secure access server 12, secure session data 120, and secure session data 122.

As described in FIG. 1, a user may in some examples migrate a secure session from one computing device to another. In such examples, secure session data may be sent by a first computing device to a second computing device and the user may continue the secure session on a second computing device. In some examples, the secure session between the first computing device and the secure access appliance may be terminated upon migrating the secure session to the second computing device. In other examples, a user may wish to continue using the secure session on the first computing device while providing secure session data to the second computing device that enables the second computing device to seamlessly establish a secure session with a secure access appliance. FIG. 4 illustrates an example of this technique.

As shown in FIG. 4, secure access client 4 may initially establish a secure session 124 with secure access server 14 as described in FIGS. 1-3. When secure session 124 is established between secure access client 4 and secure access server 14, secure access server 14 may generate secure session data 120. At a later point in time, a user may wish to seamlessly establish a secure session between computing device 6 and secure access appliance 12. In some examples, secure access server 14 may require that each computing device establish a separate secure session with secure access server 14. For instance, secure access server 14 may generate a unique session identifier and/or authentication token, e.g., included in a cookie, that is based on the IP address or user agent string of client device 2. In such examples, computing device 6 having a different IP address than computing device 2 may not use such secure session data 120 of computing device 2 to establish secure session 126 with secure access appliance 12. Thus, separate secure session data must be generated for computing device 6.

In one example, secure access client 8 may send a request to secure access client 4 for secure session data to enable computing device 6 to seamlessly establish secure session 126 with secure access server 14. The request may include a user agent string, Media Access Control (MAC) address, and/or IP address of computing device 2. Secure access client 4 may receive the request and determine session access client 8 is requesting secure session data to establish a secure session with secure access appliance 12.

In some examples, secure access client 4 may generate a message 128 with data that identifies computing device 6. Examples of such data include a user agent string, MAC address, and/or IP address of computing device 6. Message 128 may further include an instruction indicating that computing device 6 is requesting secure session data required to establish a secure session with secure access appliance 12. Upon receiving message 128, secure access appliance 12 may generate secure session data 122 usable by secure access client 8 to seamless establish secure session 126 with secure access server 14. Secure session data 122 may include, e.g., a session identifier and authentication token based on the IP address and/or user agent string of computing device 6 included in message 28. Secure access server 14 may send then secure session data 122 to secure access client 4, which may in turn send secure session data 122 to computing device 6. Secure access client 8 may use secure session data 122 to establish secure session 126 with secure access server 13.

In another example, secure access client 8 may send a request to secure access client 4, as previously described, for secure session data to enable computing device 6 to seamlessly establish secure session 126 with secure access server 14. Secure access client 4 may also receive the request and determine session access client 8 is requesting secure session data to establish a secure session with secure access appliance 12. However, in the current example, secure access client 4 may include logic to generate an authentication token based on information included in the request from computing device 6. Once secure access client 4 has generated the authentication token, secure access client 4 may generate a message (not shown) that includes secure session data, e.g., the generated authentication token and an IP address or URL that identifies secure access appliance 12. Secure access client 4 may send the message including the secure session data to secure access client 8. Secure access client 4 may further send message 128 to secure access server 14. Message 128 in the current example may include the authentication token. Secure access client 8 may subsequently establish a secure session 126 with secure access server 14 using the secure session data received from secure access client 4. Because secure access client server 14 has received the authentication token from secure access client 4, secure access client 8 may authenticate with secure access server 14. In this way, computing device 6 may seamlessly establish secure session 126 with secure access appliance 12.

In still other examples, secure access client 4 sends a message to secure access appliance 12 that identifies computing device 8. For instance the message may include a user agent string. Responsive to receiving the message, secure access appliance 12 generates session data 122 usable by computing device 8 to establish secure session 126 with secure access appliance 12. At a later point in time, computing device 8 may send a request to secure access appliance 12 to establish secure session 126 with secure access appliance 12. Because secure access appliance 12 has generated secure session data 122, computing device 8 need not re-authenticate with secure access appliance 12 to establish a secure session.

Figure 5:
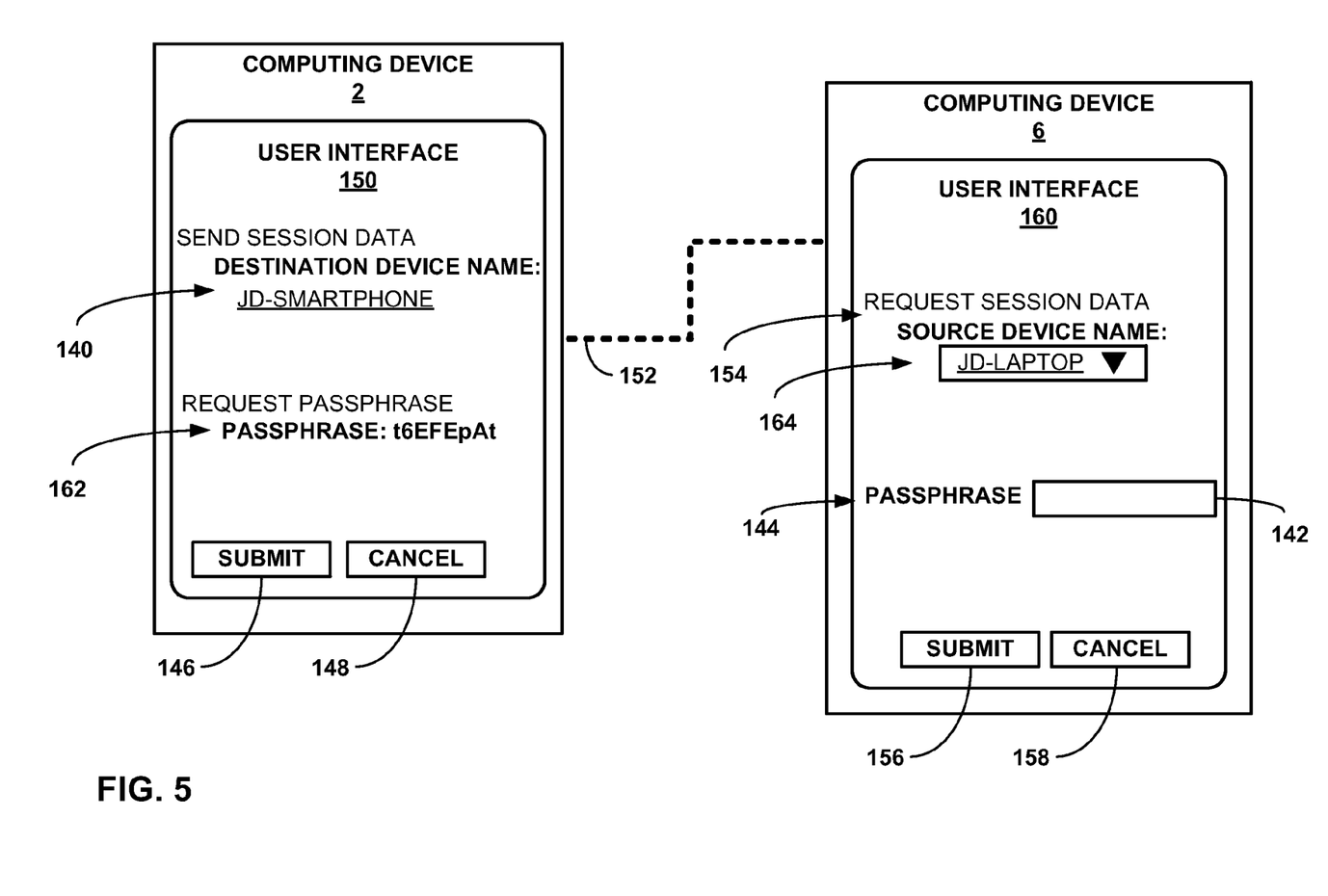
FIG. 5 is a block diagram illustrating an example of a first computing device seamlessly migrating a secure session to a second computing device, in accordance with aspects of the present disclosure.

FIG. 5 is a block diagram illustrating an example of a first computing device seamlessly migrating a secure session to a second computing device, in accordance with aspects of the present disclosure. In some examples, a secure access client may provide additional security measures to prevent inadvertent or malicious transfer of secure session data from one computing device to another. For example, authentication credentials such as a username and password or passphrase may be required to transfer secure session data from one computing device to another. In other examples, tethering may be required between each computing device before transferring secure session data from one computing device to another. The various components included in FIG. 5 may include similar properties and characteristics as described in FIGS. 1 and 2 unless otherwise described hereinafter. As shown in FIG. 5, computing device 2 includes user interface 150. User interface 150 further includes text 140, 162, and control buttons 146 and 148. Computing device 2 may be connected to computing device 6 by connection 152, which may be wired or wireless and use any well-known communications protocols. Computing device 6 includes user interface 160. User interface 160 may further include text 144, 154, input field 142, drop-down menu 164, and control buttons 156, 158.

In one example of tethering, a secure access client may only permit a user to migrate secure session data from computing device 2 to computing device 6 when the devices are tethered, e.g., the devices are logically paired such that a secure access appliance permits the migration of a secure session. For example, a secure access appliance may store one or more policies that specify logical pairings of computing devices that are allowed to send and receive secure session data. In one example, prior to computing device 2 sending secure session data to computing device 6, computing device 2 queries a secure access appliance to determine whether computing device 2 is allowed to send secure session data to computing device 6. The secure access appliance queries one or more policies and sends a response to computing device 2 indicating whether secure session data may be transferred to computing device 6. Upon receiving the response, computing device 2 either sends the secure session data if allowed to computing device 6, or a data indicating secure session data may be not be sent.

In the example of FIG. 5, a user may wish to migrate a secure session from computing device 2 to computing device 6. Initially, the devices may not be tethered, e.g., a secure access appliance does not include a pairing between computing devices 2, 6 indicating logical association between the devices. Because the devices are not tethered, computing device 2 is not allowed to transfer secure session data to computing device 6. The user may select a function of the secure access client on computing device 6 to generate a request for secure session data from computing device 2. Responsive to selecting the function, user interface 160 may display text 154, drop-down menu 160, and control buttons 156, 158. Text 154 indicates the user may select a computing device by device name. Drop-down menu 60 may display computing devices from which computing device 6 may receive secure session data.

In the current example, computing device 2 receives the request from computing device 6 for secure session data. Computing device 2 in turn generates a request to a secure access appliance to determine whether computing device 2 is allowed to send secure session data to computing device 6. In the current example, the secure access appliance determines, based on a policy, that computing device 2 is not allowed to send secure session data to computing device 6. The secure access appliance sends a response to computing device 2 indicating computing device 2 may send to secure session data to computing device 6. Computing device 2 further sends data indicating secure session data may not be sent to computing device 6. Because secure session data may be not be sent to computing device 6, no device names may appear in drop-down menu 160. No device names may appear because the secure access appliance may not permit computing device 6 to secure session data to computing device 6.

In a different example, computing device 2 and computing device 6 are tethered as shown by a logical association 152. When the user selects a function on computing device 6 to generate a request for secure session data from computing device 2, drop-down menu 160 may display the device name of computing device 2 because the computing devices are logically associated and therefore compliant with the one or more rules requiring tethering. For example, using techniques as described in the previous example, computing device 2 may determine that secure session data may be transferred to computing device 6. The user may subsequently select control button 156 labeled "Submit," which may cause the secure access client of computing device 6 to generate a request for secure session data as described in FIGS. 1-3. The request may be sent by computing device 6 to computing device 2.

In some examples, upon receiving the request from computing device 6, computing device 2 may generate a message that includes the requested secure session data and send the message to computing device 6 as described in FIGS. 1-3. In other examples, however, the secure access client executing on computing device 6 may require the user to enter one or more authentication credentials, e.g., a passphrase, before generating and sending a message that includes secure session data to computing device 6. Example techniques requiring one or more authentication credentials such as a username and password may be used in examples with or without tethering.

As shown in FIG. 5, when computing device 6 sends a request to the secure access client of computing device 2, the secure access client of computing device 2, which may display user interface 150. As shown in FIG. 5, the user is presented with control buttons 146, 148 that enable the user to submit a request for an authentication credential, e.g., a passphrase. When the user wishes to migrate the session from computing device 2 to computing device 6, the user selects control button 146. The secure access client executing on computing device 2 requests an authentication credential from a secure access appliance that the secure access client in turn receives from the secure access appliance. To migrate the session from computing device 2, the user must enter the passphrase in computing device 6. For example, the user may enter the passphrase into input field 142 and select control button 156.

Upon entering the passphrase and selecting control button 156, computing device 6 sends the passphrase to computing device 2 and receives secure session data from computing device 2. The secure session client of computing device 2 validates the passphrase received from computing device 6 with the passphrase received from the secure access appliance. Computing device 2 sends the secure session data to computing device 6 if the passphrase is valid. If the passphrase is invalid, computing device 2 may not send the secure session. Although in the current example the passphrase is generated and received from a secure access appliance, the passphrase may in other examples be generated and received from computing device 2.

Various embodiments of the invention have been described. These and other embodiments are within the scope of the following claims.

The invention claimed is:
1. A method comprising:
    establishing, by a first client computing device, a first secure session with a secure access appliance;
    receiving, by the first client computing device directly via a communication channel that is not mediated by the secure access appliance, a request from a second client computing device for secure session data for the first secure session usable by the second client computing device to establish a second secure session with the secure access appliance;
    receiving, by the first client computing device and from the secure access appliance, data that indicates whether the first client computing device is allowed to send the secure session data to the second client computing device;
    generating, by the first client computing device, a message including the secure session data for the first secure session; and
    sending, by the first client computing device and without mediation of the secure access appliance, and based on the data that indicates whether the first client computing device is allowed to send the secure session data, the message directly to the second client computing device only when the first client computing device is allowed to send the secure session data to the second client computing device.
2. The method of claim 1, further comprising:
    responsive to receiving the message, establishing, by the second client computing device, the second secure session with the secure access appliance using the secure session data for the first secure session.
3. The method of claim 1, further comprising:
    receiving, by the first client computing device, user input comprising one or more authentication credentials to authenticate a user;
    sending, by the first client computing device, the one or more authentication credentials to the secure access appliance;
    receiving, by the client computing device and from the secure access appliance, an authentication token to authenticate data communications with the secure access appliance,
    wherein the secure session data comprises the authentication token.
4. The method of claim 1, wherein the secure session data further comprises at least a session identifier that uniquely identifies the secure session.
5. The method of claim 1, wherein the secure session data further comprises at least a public key or a private key used by the first client computing device to authenticate to the secure access appliance.
6. The method of claim 1, further comprising:
    generating, by the first client computing device, a communication channel with the second client computing device; and
    receiving, by the first client computing device, the request from a second client computing device for secure session data via the communication channel.
7. The method of claim 6, wherein the request received by the first client computing device from the second client computing device is communicated using a Bluetooth, Near-Field Communication, Universal Serial Bus or IEEE 1394 protocol.
8. The method of claim 1, further comprising:
    wherein the data that indicates whether the first client computing device is allowed to send the secure session data comprises a user agent string that uniquely identifies the second client computing device;
    sending, by the first client computing device, the user agent string to the secure access appliance, wherein the user agent string is usable by the secure access appliance to determine, based at least on a policy, if the first client computing device is allowed to send the secure session data to the second client computing device.
9. The method of claim 8, wherein the policy comprises:
    at least one association between an authentication credential and the user agent string; and
    at least one rule associated with the association, wherein the rule specifies at least one constraint on the first client computing device or at least one action of the first client computing device.
10. The method of claim 1, further comprising:
    receiving, by the first client computing device, the request from the second client computing device for secure session data;
    determining, by the first client computing device, whether the first client computing device is allowed to send secure session data to the second client computing device; and
    wherein sending, by the first client computing device, the message to the second client computing device comprises sending the message only when the first client computing device is allowed to send the secure session data to the second client computing device.
11. The method of claim 1, further comprising:
    receiving, by the first client computing device, the request from the second client computing device for secure session data;
    responsive to receiving the request, sending, by the first client computing device, a second request to the secure access appliance for a first authentication credential;
    receiving, by the first client computing device from the secure access appliance, the first authentication credential;

receiving, by the first client computing device from the second client computing device, a second authentication credential;

determining, by the first client computing device, whether the second authentication credential is valid based at least on the first authentication credential;

wherein sending, by the first client computing device, the message to the second client computing device comprises sending the message only when the first client computing device is allowed to send the secure session data to the second client computing device.

12. The method of claim 1, further comprising:

sending, by the first client computing device, a user agent string that identifies the first client computing device to the second client computing device, wherein the user agent string is usable by the secure access appliance to determine whether the first client computing device is allowed to send the secure session data to the second client computing device;

receiving, by the first client computing device and from the secure access appliance, a second message indicating whether the first client computing device is allowed to send the secure session data to the second client computing device; and determining, by the first client computing device, whether to send the secure session data to the second client computing device based at least on the second message.

13. The method of claim 1, further comprising:

determining, by the first client computing device, the request includes data identifying the second client computing device;

sending, by the first client computing device, a second message to the secure access appliance, wherein the data identifying the second client computing device is usable by the secure access appliance to generate the secure session data for the second secure session; and receiving, by the first client computing device and from the secure access appliance, the secure session data.

14. The method of claim 1, wherein the data identifying the second client computing device comprises at least a user agent string, Media Access Control (MAC) address, or Internet Protocol address of the second client computing device.

15. The method of claim 1, further comprising:

determining, by the first client computing device, the request includes data identifying the second client computing device;

generating, by the first client computing device, the secure session data based at least on the data identifying the second client computing device; and sending, by the first client computing device, the secure session data and the data identifying the second client computing device to the secure access appliance server.

16. The method of claim 1, wherein the communication channel comprises a connection enabling communication between the first client computing device and the second client computing device, wherein the connection is not mediated by the secure access appliance.

17. A method comprising:

establishing, by a first client computing device, a first secure session with a secure access appliance using first secure session data;

receiving, by the first client computing device directly via a communication channel that is not mediated by the secure access appliance, a request from a second client computing device for second secure session data that is different than the first secure session data and usable by the second client computing device to establish a second secure session with the secure access appliance;

receiving, by the first client computing device and from the secure access appliance, data that indicates whether the first client computing device is allowed to send the secure session data to the second client computing device;

generating, by the first client computing device, a message including the second secure session data for the second secure session; and sending, by the first client computing device and without mediation of the secure access appliance, and based on the data that indicates whether the first client computing device is allowed to send the secure session data, the message directly to the second client computing device only when the first client computing device is allowed to send the secure session data to the second client computing device.

18. A client computing device comprising:

a session migration module that establishes a first secure session with the secure access appliance;

one or more network interfaces that receive, directly via a communication channel that is not mediated by the secure access appliance, a request from a second client computing device for secure session data for the first secure session usable by the second client computing device to establish a second secure session with the secure access appliance;

wherein the secure migration module receives, from the secure access appliance, data that indicates whether the first client computing device is allowed to send the secure session data to the second client computing device;

wherein the session migration module generates a message including the secure session data for the first secure session; and wherein the one or more network interfaces send, without mediation of the secure access appliance, and based on the data that indicates whether the first client computing device is allowed to send the secure session data, the message directly to the second client computing device only when the first client computing device is allowed to send the secure session data to the second client computing device.

19. The client computing device of claim 18, wherein the session migration module receives user input comprising one or more authentication credentials to authenticate a user;

wherein the one or more network interfaces send the one or more authentication credentials to the secure access appliance; and wherein the one or more network interfaces receive from the secure access appliance, an authentication token to authenticate data communications with the secure access appliance, wherein the secure session data comprises the authentication token.

20. The client computing device of claim 18, wherein the secure session data further comprises at least a session identifier that uniquely identifies the secure session.

21. The client computing device of claim 18, wherein the secure session data further comprises at least a public key or a private key used by the client computing device to authenticate to the secure access appliance.

22. The client computing device of claim 18, wherein the one or more network interfaces generate a communication channel with the second computing device; and wherein the one or more network interfaces receive the request from an client second computing device for secure session data via the communication channel.

23. The client computing device of claim 22, wherein the request received by the client computing device from the second client computing device is communicated using a Bluetooth, Near-Field Communication, Universal Serial Bus or IEEE 1394 protocol.

24. The client computing device of claim 22,
wherein the data that indicates whether the client computing device is allowed to send the secure session data comprises a user agent string that uniquely identifies the second client computing device, wherein the user agent string is usable by the secure access appliance to determine, based at least on a policy, if the client computing device is allowed to send the secure session data to the second client computing device.

25. The client computing device of claim 22, wherein the policy comprises:
at least one association between an authentication credential and the user agent string; and
at least one rule associated with the association, wherein the rule specifies at least one constraint on the client computing device or at least one action of the first client computing device.

26. The client computing device of claim 22,
wherein the one or more network interfaces receive the request from the second client computing device for secure session data;
wherein the session migration module determines whether the client computing device is not allowed to send secure session data to the second client computing device; and
wherein the session migration module sends the message to the second client computing device only when the first client computing device is allowed to send the secure session data to the second client computing device.

27. The client computing device of claim 22,
wherein the one or more network interfaces receive the request from the second client computing device for secure session data and sending a second request to the secure access appliance for a first authentication credential;
wherein the session migration module receives from the second client computing device, a second authentication credential;
wherein the session migration module determines the second authentication credential is valid based at least on the first authentication credential; and
wherein the session migration module sends the message to the second client computing device only when the first client computing device is allowed to send the secure session data to the second client computing device.

28. The client computing device of claim 22,
wherein the one or more network interfaces send a user agent string that identifies the client computing device or the second client computing device, wherein the user agent string is usable by the secure access appliance to determine whether the client computing device is allowed to send the session migration data to the second client computing device;
wherein the one or more network interfaces receive from the secure access appliance a second message indicating whether the client computing device is allowed to send the session migration data to the second client computing device; and wherein the session migration module determines whether to send the session migration data to the second client computing device based at least on the second message.

29. The client computing device of claim 18, wherein the communication channel comprises a connection enabling communication between the client computing device and the second client computing device, wherein the connection is not mediated by the secure access appliance.

30. A secure access appliance comprising:
a control unit having one or more processors that:
establishes a first secure session with a first client computing device, responsive to receiving a first request from the first client computing device;
sends, to the first client computing device, data that indicates whether the first client computing device is allowed to send the secure session data to the second client computing device;
establishes a second secure session with a second client computing device, responsive to receiving a second request from the second client computing device, wherein establishing the second secure session is subsequent to:
the first client receiving, directly via a communication channel that is not mediated by the secure access appliance, a third request from the second client computing device for secure session data for the first secure session that is usable by the second client computing device to establish the second secure session with the secure access appliance, and
the first client computing device sending, without mediation of the secure access appliance, and based on the data that indicates whether the first client computing device is allowed to send the secure session data, a message including the secure session data for the first secure session directly to the second client computing device only when the first client computing device is allowed to send the secure session data to the second client computing device.

31. A system comprising:
a first client computing device comprising a control unit having one or more processors;
a second client computing device;
a communication channel between the first client computing device and the second client computing device;
a secure access appliance;
wherein the first client computing device comprises a session migration module operable by the control unit having one or more processors to establish a secure session with the secure access appliance;
wherein the first client computing device comprises one or more network interfaces configured to receive a request, directly via the communication channel that is not mediated by the secure access appliance, from the second client computing device for secure session data usable by the second client computing device to establish the secure session with the secure access appliance;
wherein the one or more network interfaces receive, from the secure access appliance, data that indicates whether the first client computing device is allowed to send the secure session data to the second client computing device;
wherein the session migration module is operable by the control unit to generates a message that includes the secure session data;
wherein the one or more network interfaces are configured to directly send, without mediation of the secure access appliance, and based on the data that indicates whether the first client computing device is allowed to send the secure session data, the secure session data to the second client computing device only when the first client computing device is allowed to send the secure session data to the second client computing device; and wherein the second client computing device, responsive to receiving the message, establishes the secure session with the secure access appliance.

\* \* \* \* \*